United States Patent Office  2,942,917
Patented June 28, 1960

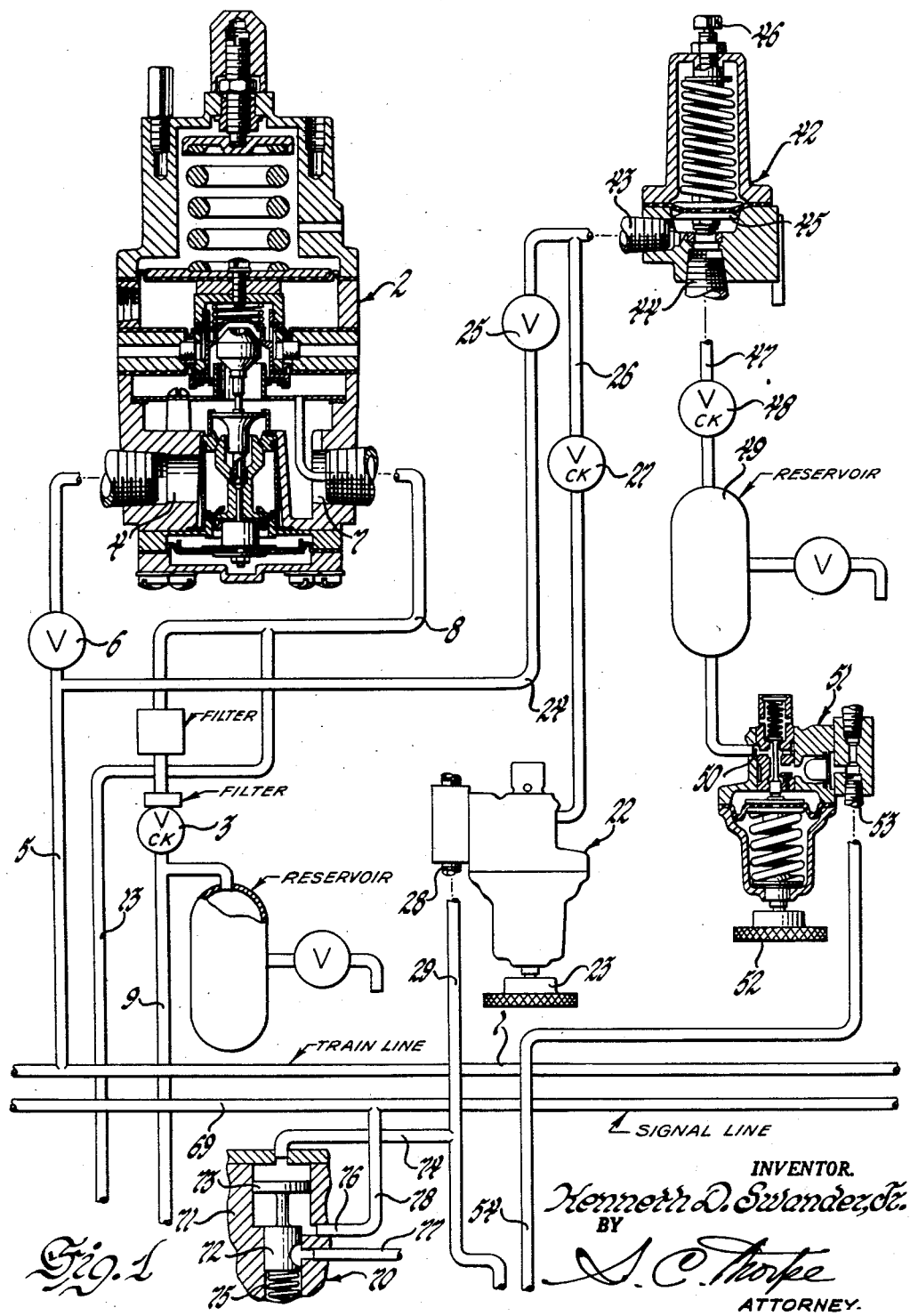

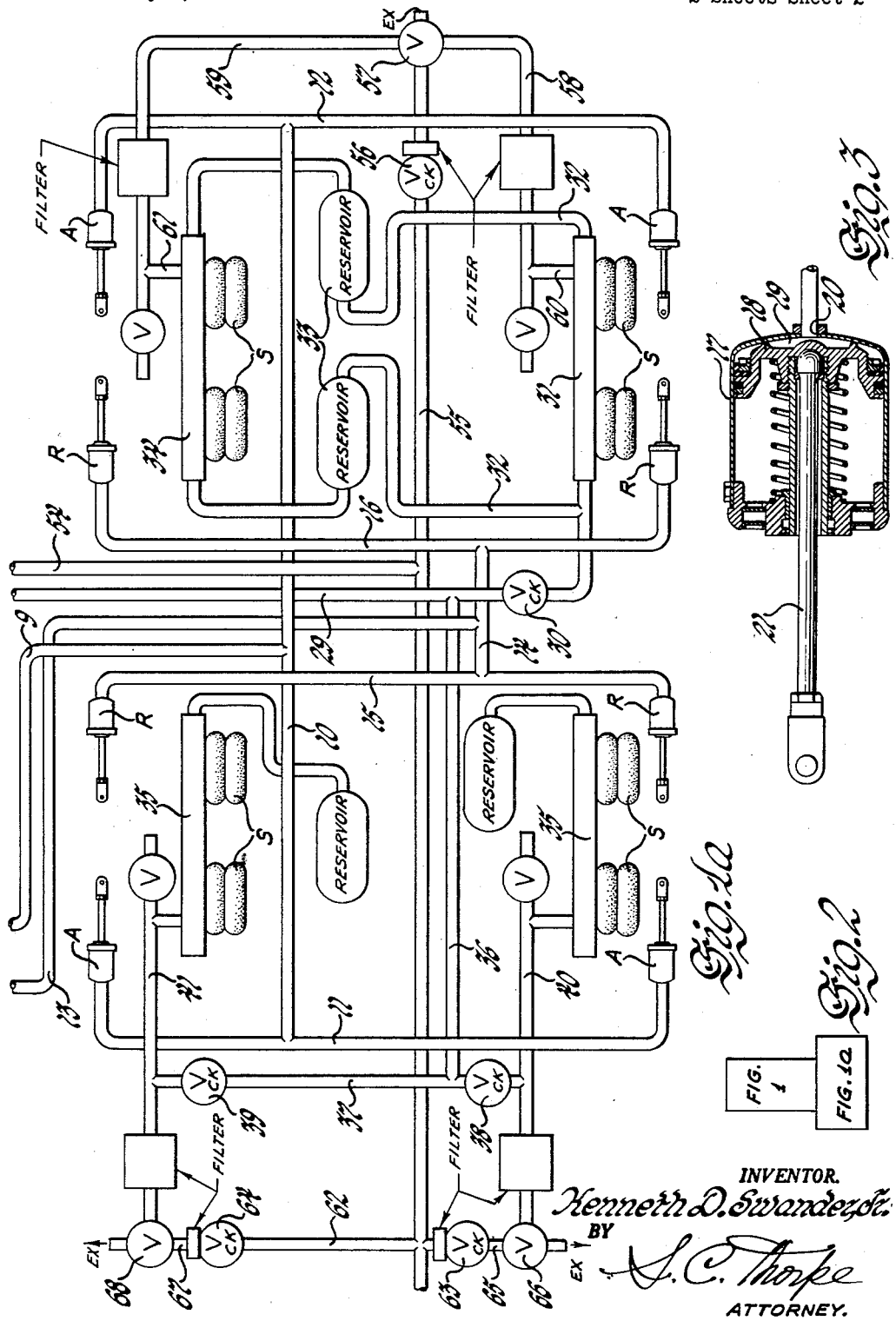

2,942,917

COMPOSITE AIR BRAKE AND AIR SUSPENSION CHARGING AND SIGNALING SYSTEMS

Kenneth D. Swander, Jr., La Grange, Ill., assignor to General Motors Corporation, Detroit, Mich., a corporation of Delaware Filed May 2, 1957, Ser. No. 656,729

4 Claims. (Cl. 303—5)

This invention relates generally to fluid pressure systems and more particularly to pressure charging means for a combination of such systems wherein the charging of one system is limited to a predetermined necessary pressure in order to allow as rapid charging of a second system as possible after which the first system may be fully charged.

The recent use of railway vehicles having air suspensions has created certain practical operating difficulties. As is well known in railroad practice, it is customary prior to the use of a train to first charge the air brake equipment provided thereon as rapidly as possible to a certain calibrated pressure, after which, other operating parts being in proper order, the train may be moved out by the operator. Because of this practice, there have been occasions when an operator, after making certain that the brakes are fully charged by inspecting the gauges and signals provided to indicate such a condition, has moved out trains including cars with air suspensions without the suspensions in such cars being properly charged. Such premature train operation results in an extremely rough ride which is not only disturbing and possibly injurious to passengers and personnel but likely to cause derailment of one or more of the cars making up the train and any consequent injury and damage which may be occasioned thereby.

For the foregoing reasons, the present invention has been proposed which automatically provides an initial necessary charge to the air suspensions of the cars while charging the air brakes, but which discontinues any further charging of the suspension until the air brake system is fully charged, after which further charging of the suspension may take place. By providing means for accomplishing the above result, the brakes are still charged fully as quickly as possible so as to insure full adequate braking of the train while at the same time automatically reducing the hazard of the train moving out without the suspension having any charge. For a fuller understanding of this invention and the objects thereof reference may be had to the accompanying detailed description and drawings in which:

Figs. 1 and 1A, which are shown on separate sheets, represent a schematic diagram of portions of a railway vehicle including the novel composite air brake and air suspension charging system thereof;

Fig. 2 has been provided to indicate how the two sheets of drawings containing Figs. 1 and 1A should be positioned with respect to each other so as to properly connect up the related parts of the single schematic diagram.

Fig. 3 is a view of one of the air brake cylinders with parts in section to illustrate the details thereof.

This invention is applicable to any vehicle utilizing both an air brake system and an air suspension system, but is described here in connection with a special air brake system forming the subject of applicant's copending U.S. patent application Serial No. 531,315, filed August 30, 1955, now Patent No. 2,871,063. For details regarding such a brake system including the components and sub-combinations thereof reference may be made to the above-identified patent application. The particular type of air brake system used, however, does not form the subject of this invention, and consequently no detailed description is deemed necessary with respect thereto, other than to indicate that there is an air brake system for the vehicle which is adapted to be supplied by a pressure source on the vehicle (such as a trainline or brake pipe).

Referring now to Figs. 1 and 1A when properly positioned with respect to each other as indicated in Fig. 2, a trainline 1 is shown, which in addition to running through the car shown, extends the length of the train and constitutes an air pressure source for each car. The trainline 1 normally has connected thereto at the head end of the train a compressor (not shown) for producing air pressure in the line. In addition to the trainline 1, there is also shown a so-called reversing relay indicated generally by the numeral 2, one of whose purposes is to regulate the charging pressure in both the application and release air brake cylinders A and R respectively of the air brake system. It acts in combination with a one-way check valve 3 and in response to a manually variable pilot pressure to vary the pressure in the air brake application cylinders to apply the air brakes in varying degrees in a manner which, since the application and release of the brakes has no bearing on the present invention, will not be further described here. If further information is desired regarding the structure and operation of such a valve, reference may be made to the above-identified application. The inlet 4 of reverse relay 2 is normally connected to the pressure source of trainline 1 by pipe 5 and cut-out cock 6. The outlet 7 of reverse relay 2 is connected to the application brake cylinders A by pipe 8 including a filter, the afore-mentioned check valve 3, and pipes 9, 10, 11 and 12. Outlet 7 of relay 2 is also connected to the release brake cylinders R by pipes 8, 13, 14, 15 and 16.

A detail of one of the application or release brake cylinders is shown in Fig. 3. Each such cylinder includes a cylinder 17, a piston 18 defining an expansible chamber 19 with the cylinder 14, and air supply port 20 leading to chamber 18, and a brake operating rod 21 connected to the brake levers (not shown).

The pneumatic suspension of the vehicle includes as a part thereof a pressure reducing valve indicated generally by a numeral 22. Valve 22 is one example of a standard type of reducing valve which may be manually adjusted by the thumb screw 23 to reduce and limit higher pressures supplied to the inlet side thereof to predetermined lower pressures at the outlet side. If further information regarding such a valve is desired, reference may be made to p. 83, Instruction Pamphlet No. 5066, Westinghouse Airbrake Co., Wilmerding, Pennsylvania. Pressure reducing valve 22 is connected to the air pressure source of trainline 1 by pipe 5, pipe 24 including cut-out cock 25, and pipe 26 including one-way check valve 27 allowing flow into the inlet port of pressure reducing valve 22. The outlet port 28 of valve 22 is connected by pipe 29 including check valve 30 to reservoir 31 which represents a sprung portion of one of the corners of the vehicle supported by and communicating with a first set of air springs S. The outlet of pressure reducing valve 22 also is connected via the piping 29 including check valve 30 and by reservoir 31 to pipes 32 including volume reservoirs 33. Pipes 32 transmit air to a second reservoir 34 also forming a sprung portion of the vehicle at another corner thereof which is resiliently supported by a second set of resilient air springs S communicating with the interior of the reservoir 34. The outlet of pressure reducing valve 22 in a like manner is adapted to supply air at a predetermined reduced pressure to reservoirs 35 as well as sets of air springs S at an opposite end of the vehicle via piping 29, pipe 36, pipe 37, including check valves 38 and 39; and by pipes 40 and 41.

Also included as a part of the pneumatic suspension is a regulating valve indicated generally by numeral 42 whose inlet 43 and outlet 44 are disconnected from each other by diaphragm piston and valve 45 until a calibrated pressure is applied to the underside of diaphragm piston 45 as set by the adjusting screw 46. The inlet 43 of regulating valve 42 is connected to the trainline pressure source 1 by pipes 5 and 24. The outlet 44 of regulating valve 42 is connected by a pipe 47 including a one-way check valve 48 and a volume reservoir 49 to the inlet 50 of a second pressure reducing valve indicated generally by numeral 51. Pressure reducing valve 51 is similar structurally and in operation to pressure reducing valve 22 and, consequently, any detailed explanation of either valve should suffice for the other. As mentioned with respect to valve 22, valve 51 also may be manually adjusted by the thumb screw 52 to reduce the pressure supplied thereto to some lower fixed pressure. The outlet 53 of pressure reducing valve 51 is connected by pipes 54 and 55 including a one-way check valve 56 to an air leveling valve 57. Leveling valve 57 acts in the well known way to supply air pressure to reservoirs 31 and 34 and air springs S when these air springs are under-inflated and to exhaust air therefrom through exhaust EX when springs S are over-inflated, all via piping 58, 59, 60 and 61, some portions of which include suitable filters so designated. The outlet port 53 of pressure reducing valve 51 is also connected by pipes 54 and 55 to pipe 62 including at the opposite end of the vehicle oppositely transversely disposed one-way check valves 63 and 64. Located downstream from one-way check valve 63 and connected thereto by pipe 65 is a leveling valve 66 which acts in the same manner as 57 to serve the air springs S connected to one of reservoirs 35. Similarly, downstream of one-way check valve 64 and connected thereto by pipe 67 is a leveling valve 68 which is connected to the other reservoir 35 by piping 41 and serves to inflate or deflate the air springs S connected thereto depending on the deflection between sprung and unsprung portions of the vehicle at that location of the vehicle corresponding to the upper left hand corner of Fig. 1A.

Also included as a part of the pneumatic suspension of the vehicle is a signaling system to indicate whether there is a sufficient charge in the air suspension system to permit moving out of the train including such vehicles. This signaling portion includes a signal line 69 (see Fig. 1) which extends to the locomotive cab of the train and which, when the pressure is sufficiently reduced therein, causes a whistle to blow, an indicator to light, etc. The signal line is normally charged by suitable means (not shown) to a certain pressure so that any subsequent pressure reduction in the line will have the aforementioned effect. A signal valve indicated generally by the number 70 includes a housing 71 enclosing a valve 72 which is connected for operation to a piston 73. The upper face of piston 73 is connected by pipe 74 to pipe 29 leading from the outlet of pressure reducing valve 22 to the reservoirs 31, 34 and 35 and air springs S so that as long as there is a sufficient charge in these reservoirs and springs, the pressure acting on the upper face of piston 73 will maintain valve 72 biased downwardly against spring 75, thereby disconnecting ports 76 and 77 of the valve. If, however, the pressure in the reservoirs and pipe 29 should be insufficient to maintain piston 73 and valve 72 down, the spring will cause it to move up and connect ports 76 and 77 together, thereby exhausting air in the signal line 69 via pipe 78, to cause some sort of signal indication in the locomotive cab.

The operation of this composite air brake and air suspension charging and signaling system is as follows:

Assuming that there is no charge in the air brake cylinders or in the reservoirs of the car but that the trainline 1 has been or is being charged, then air will flow through pipe 5 to the reverse relay 2 which, in a well known way, will allow air to flow therethrough to start charging the application and release brake cylinders of the brake system. At the same time, air will flow from the trainline through pipes 5, 24, 26, check valve 27, and pressure reducing valve 22, to the reservoirs 31, 34 and 35, and air springs S until the pressure in the reservoirs reaches a relatively low pressure of perhaps 27 p.s.i. which is sufficient to resiliently support the sprung portions of the vehicle after which no further charging of these reservoirs will occur until the air brake cylinders are completely charged. After the air brake cylinders have been charged to the pressure set by the reverse relay 2, the air pressure in pipe 24 will build up beyond the pressure in the brake cylinders until it reaches the calibrated pressure set by the regulating valve 42 causing opening of that valve and allowing air to flow from the trainline 1 through pipes 5, 24 and the now open regulator valve 42 and pipe 47 to the second pressure reducing valve 51 which is, however, set for a pressure somewhat higher than that normally needed in the air springs S to support the unsprung portions of the vehicle at the proper height. The air from the pressure reducing valve 51 may then flow through the piping provided which includes 54 and 55 and check valves 56, 63 and 64 to the respective leveling valves of the suspension system. These leveling valves (57, 66, 68) under conditions of low pressure in the springs S will normally be open to allow the supply of air to these springs which will then be further charged and inflated until the proper height of the sprung portions of the vehicle to the unsprung portion will be reached under static conditions, after which time no further air will be supplied to the springs.

From the foregoing it may now be appreciated that the composite air brake and air suspension charging system enables the air brakes to be charged fully as quickly as possible while at the same time eliminating the hazard of the vehicle having no charge in its air suspension system subsequent to full charging of the brakes.

I claim:

1. In a vehicle including an air brake system and a pneumatic suspension system, an air pressure source, a first communicating connection from said source to said suspension system including air pressure reducing means limiting the air supplied thereby from said source to said suspension system to a predetermined pressure, a communicating connection from said source to said air brake system including pressure regulating means charging said air brake system to a calibrated pressure higher than said predetermined pressure, and a second communicating connection from said source to said suspension system including valve means responsive to a pressure above said calibrated pressure to additionally charge said suspension system above said predetermined pressure.

2. In a vehicle including an air brake system and a pneumatic suspension system, an air pressure source, a first communicating connection from said source to said air suspension system including air pressure reducing means limiting the air supplied thereby from said source to said air suspension system to a predetermined pressure, a communicating connection from said source to said air brake system including pressure regulating means charging said air brake system to a calibrated pressure higher than said predetermined pressure, and valve means responsive to pressure above said calibrated pressure to connect said source to said suspension system to additionally charge said suspension system above said predetermined pressure.

3. A composite air brake and air suspension air pressure charging system for a vehicle including an air brake system normally to be charged to a calibrated pressure to maintain brakes of said vehicle released and a pneumatic suspension system normally to be charged to a pressure higher than a predetermined pressure to resiliently support sprung portions of said vehicle on unsprung portions thereof, comprising an air pressure source normally exceeding said predetermined and calibrated pressures, air pressure reducing means connecting said source to said suspension system to limit charging of said suspension system to said predetermined pressure, regulating valve means connecting said source to said air brake system to charge said air brake system to said calibrated pressure which is higher than said predetermined pressure, and valve means responsive to pressures above said calibrated pressure to connect said source to said suspension system to additionally charge said suspension system above said predetermined pressure.

4. In combination with a vehicle including an air brake system and a pneumatic suspension system, composite air pressure charging means therefor comprising an air pressure source, regulating valve means connecting said source to said air brake system to charge said system to a calibrated pressure, valve means connecting said source to said pneumatic suspension system to charge said pneumatic system to a predetermined pressure which is lower than said calibrated pressure and further responsive to pressures above said calibrated pressure to additionally charge said pneumatic system above said predetermined pressure.

References Cited in the file of this patent
UNITED STATES PATENTS

| | | |
|---|---|---|
| 507,447 | Moyes | Oct. 24, 1893 |
| 779,858 | Lillie | Jan. 10, 1905 |
| 2,053,461 | Campbell | Sept. 8, 1936 |
| 2,150,576 | Bell | Mar. 14, 1939 |
| 2,289,491 | Fitch | July 19, 1942 |
| 2,361,575 | Thompson | Oct. 31, 1944 |